United States Patent
Alcazaren

(10) Patent No.: US 7,586,843 B1
(45) Date of Patent: Sep. 8, 2009

(54) COMMUNICATION NETWORK HAVING WIRELESS ACCESS TO A SERVICE CENTER

(75) Inventor: Edgar C. Alcazaren, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 407 days.

(21) Appl. No.: 11/548,751

(22) Filed: Oct. 12, 2006

(51) Int. Cl.
*H04J 1/16* (2006.01)
*H04J 3/14* (2006.01)

(52) U.S. Cl. ...................... 370/222; 370/223

(58) Field of Classification Search ................. 370/338
See application file for complete search history.

(56) References Cited

U.S. PATENT DOCUMENTS

2002/0181503 A1* 12/2002 Montgomery, Jr. .......... 370/468
2004/0095907 A1* 5/2004 Agee et al. .................. 370/334

OTHER PUBLICATIONS

Mobility Management for Hierarchical Wireless Networks, Pei et. al. with a publish date of Aug. 2001, Mobile Networks and Applications Publisher Springer Netherlands, vol. 6, No. 4, pp. 331-337.*
Hughes Network Systems; Backhauling 3G and 2G Traffic with Point-to Multipoint Radio Systems; Jan. 2003; 12 pages; Hughes Network Systems, Inc.
Karen Brown; Backhaul Overhaul; Sep. 15, 2005; 2 pages; http://www.wirelessweek.com/article/CA6257017.html?text=fibertower.
Steve Byars; Using Pseudo-Wires for Mobile Wireless Backhaul over Carrier Ethernet; Feb. 13, 2006; 6 pages; http://www.convergedigest.com/bp-me/bp1.asp?ID=312&ctgy=.

* cited by examiner

*Primary Examiner*—Ajit Patel

(57) ABSTRACT

A communication network has an open-ended communication loop coupled to a communication ring at separate points on the ring. The communication network has wireless access points that are coupled to the loop. The wireless access points exchange user communications in a wireless communication format with user wireless communication devices. The wireless access points exchange the user communications with a service center over the communication loop and the communication ring. The wireless access points re-route the user communications to avoid a fault on the loop.

19 Claims, 6 Drawing Sheets

COMMUNICATION NETWORK HAVING WIRELESS ACCESS TO A SERVICE CENTER

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication networks that provide wireless access to communication services.

2. Description of the Prior Art

User demand for wireless access to communication services is rapidly growing. In a typical wireless access scenario, a user operates a wireless communication device to exchange wireless communication signals over the air with a wireless access point. The wireless access point exchanges the user communications with a service center over a communication network. The service center processes the user communications to provide a service, such as telephony communication, Internet access, or video streaming.

Examples of wireless communication devices include mobile telephones, personal digital assistants, and laptop computers. Examples of wireless access points include base stations, WIFI hotspots, and antenna systems. Examples of service centers include mobile switching centers, Internet access points, and media servers. Examples of wireless formats include CDMA, WIFI, and WIMAX.

As the user demand for wireless access to communication services has increased, so has the deployment of wireless access points. Various communication networks have been developed to exchange user communications between the growing number of wireless access points and the service center. Unfortunately, these communication networks have not been optimized for both efficiency and reliability.

FIG. 1 illustrates an example of a prior communication network that exchanges user communications between wireless access points and a service center (the wireless access points use the acronym WAP on the figures). Note that groups of proximate wireless access points are coupled in series to form a serial route to the service center. Each wireless access point has a point-to-point communication link to the service center in the serial route.

For example, wireless access points A, B, and C each have their own point-to-point communication link to the service center that follows the serial route. If there is a fault (indicated by an "X" mark on the figures) on the serial route between wireless access point B and wireless access point C, then the point-to-point communication links from wireless access points A and B to the service center are lost.

FIG. 2 illustrates another example of a prior communication network that exchanges user communications between wireless access points (WAPs) and a service center. Note that the service center is now coupled to a central communication ring. Also note that groups of proximate wireless access points are coupled to collector communication rings. Each collector ring is coupled to the central ring through a ring node. Thus, the wireless access points communicate with the service center over the collector rings and the central ring.

Each wireless access point has a point-to-point communication link over the rings to the service center. For example, wireless access point B has a point-to-point communication link to the service center through wireless access point C and ring nodes E and F (B-C-E-F-SC). For back-up in the event of a fault, wireless access point B has a second point-to-point link to the service center through wireless access point A and ring nodes E and D (B-A-E-D-SC).

For a fault on the collector ring between wireless access point B and wireless access point C, wireless access point B and the service center would switch user communications from the failed first link (B-C-E-F-SC) to the operational second link (B-A-E-D-SC). Likewise, for a fault on the central ring between ring node E and ring node F or between ring node F and the service center, wireless access point B and the service center would switch user communications from the failed first link (B-C-E-F-SC) to the operational second link (B-A-E-D-SC).

Unfortunately, there are still problems with the prior communication network of FIG. 2. If a ring node fails, then the wireless access points that are served by the failed ring node cannot communicate with the service center. For example, if ring node E fails, then wireless access points A, B, and C cannot communicate with the service center over any of the point-to-point communication links.

In addition, the point-to-point links typically have a dedicated amount of bandwidth that goes unused—especially on the back-up links. Thus, the point-to-point links between the wireless access points and the service center represent an inefficient use of bandwidth.

SUMMARY OF THE INVENTION

Examples of the invention include a communication network. The communication network comprises a communication ring including a first communication node, a second communication node, a third communication node, and a fourth communication node. The communication network comprises a first communication loop coupled to separate points on the communication ring through the first communication node and the second communication node. The communication network comprises a second communication loop coupled to separate points on the communication ring through the third communication node and the fourth communication node. The communication network comprises a service center coupled to the communication ring. The communication network comprises a first set of wireless access points coupled to the first communication loop. The communication network comprises a second set of wireless access points coupled to the second communication loop. The wireless access points are configured to exchange user communications in a wireless communication format with user wireless communication devices. The wireless access points and the communication nodes are configured to exchange the user communications over the communication loops. The communication nodes and the service center are configured to exchange the user communications over the communication ring.

In some examples of the invention, the wireless access points and the communication nodes are configured, in response to a fault on one of the communication loops, to re-route the user communications to avoid the fault on the one communication loop.

In some examples of the invention, the communication nodes and the service center are configured, in response to a fault on the communication ring, to re-route the user communications to avoid the fault on the communication ring.

In some examples of the invention, the wireless access points and the communication nodes each include internet protocol routers that are configured to exchange the user communications over the communication loops using the internet protocol, and in response to a fault on one of the communication loops, to re-route the user communications using the internet protocol to avoid the fault on the one communication loop.

In some examples of the invention, the service center includes an internet protocol router and wherein the internet protocol routers in the communication nodes and the service center are configured to exchange the user communications over the communication ring using the internet protocol, and in response to a fault on the communication ring, to re-route the user communications using the internet protocol to avoid the fault on the communication ring.

In some examples of the invention, the communication loops comprise Ethernet links.

In some examples of the invention, the communication ring comprises an optical ring.

In some examples of the invention, the communication ring comprises a Synchronous Optical Network ring.

In some examples of the invention, the communication ring comprises a metropolitan area network.

In some examples of the invention, the wireless communication format comprises Code Division Multiple Access (CDMA).

In some examples of the invention, the wireless communication format comprises WIFI.

In some examples of the invention, the wireless communication format comprises WIMAX.

In some examples of the invention, the service center provides telephony service.

In some examples of the invention, the service center provides Internet access service.

In some examples of the invention, the service center provides video streaming service.

In some examples of the invention, the service center comprises a mobile switching center.

In some examples of the invention, the user wireless communication devices comprise mobile telephones.

In some examples of the invention, the user wireless communication devices comprise personal digital assistants.

In some examples of the invention, the user wireless communication devices comprise laptop computers.

In some examples of the invention, the first communication loop and the second communication loop are not closed to form rings.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

Figure 3:
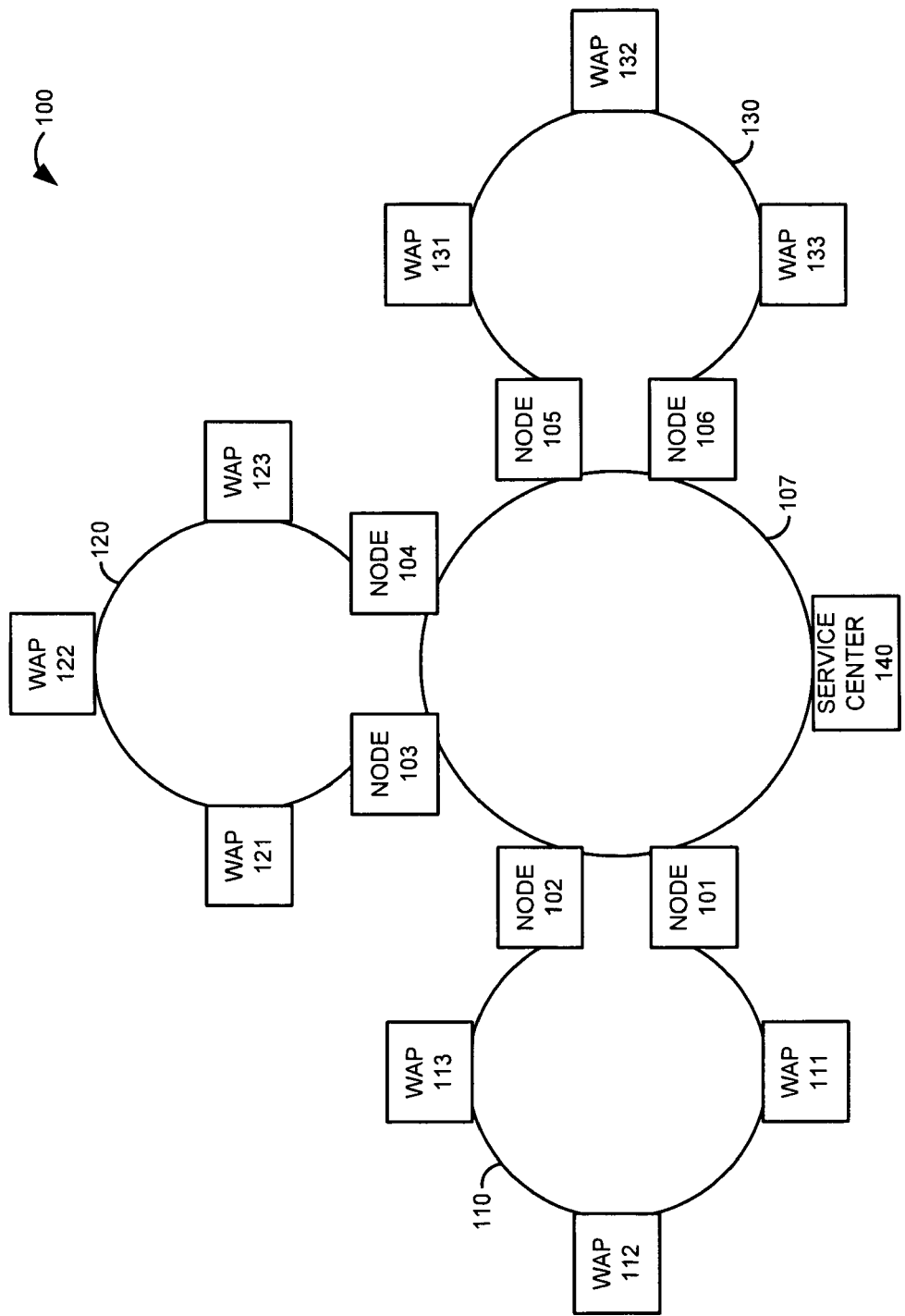
FIG. 3 illustrates a communication system including loops in an example of the invention.

FIG. 3 illustrates communication network 100 in an example of the invention. Communication network 100 includes communication ring 107; communication loops 110, 120, and 130; wireless access points (WAPs) 111-113, 121-123, and 131-133; and service center 140. Communication ring 107 includes ring nodes 101-106. Service center 140 is coupled to communication ring 107.

Wireless access points 111-113 are coupled to communication loop 110. The open ends of loop 110 are respectively coupled to ring nodes 101 and 102. Wireless access points 121-123 are coupled to communication loop 120. The open ends of loop 120 are respectively coupled to ring nodes 103 and 104. Wireless access points 131-133 are coupled to communication loop 130. The open ends of loop 130 are respectively coupled to ring nodes 105 and 106.

Note that communication loops 110, 120, and 130 are not rings, because loops 110, 120, and 130 have open ends that do not close. Instead, the open ends of communication loops 110, 120, and 130 are coupled to communication ring 107 through nodes 101-106. Note that each communication loop 110, 120, and 130 is coupled to the communication ring 107 at two separate points.

Wireless access points 111-113, 121-123, and 131-133 are each configured to exchange user communications in a wireless communication format with user wireless communication devices (not shown). Examples of the wireless communication devices include mobile telephones, personal digital assistants, and laptop computers although there could be other types of wireless communication devices. Examples of wireless communication formats include Code Division Multiple Access (CDMA), WIFI, and WIMAX, although there could be other types of wireless communication technology. Wireless access points 111-113, 121-123, and 131-133 could be base stations, WIFI hotspots, antenna systems, or some other communication system that communicates with user devices using a wireless communication format.

Wireless access points 111-113 and ring nodes 101-102 exchange the user communications over loop 110. Ring nodes 101-102 and service center 140 exchange the user communications over communication ring 107. Thus, wireless access points 111-113 and service center 140 exchange the user communications over loop 110 and ring 107. Wireless access points 121-123 and ring nodes 103-104 exchange the user communications over loop 120. Ring nodes 103-104 and service center 140 exchange the user communications over communication ring 107. Thus, wireless access points 121-123 and service center 140 exchange the user communications over loop 120 and ring 107. Wireless access points 131-133 and ring nodes 105-106 exchange the user communications over loop 130. Ring nodes 105-106 and service center 140 exchange the user communications with over communication ring 107. Thus, wireless access points 131-133 and service center 140 exchange the user communications over loop 130 and ring 107.

Communication loops 110, 120, and 130 could be comprised of packet links, time division multiplex links, or wireless links, although other types of communication links could be used. Ring nodes 101-106 could be multiplexers, switches, or routers, although other types of nodes could be used.

Service center 140 processes the user communications to provide at least one communication service. Service center 140 could be a mobile switching center, Internet access point, media server, or some other system that provides a communication service. Examples of communication services include telephony communication, Internet access, and video streaming, although there could be other communication services.

The wireless access points, ring nodes, and service center described above provide re-routing in case of a fault. In response to a fault on one of the communication loops, the wireless access points and ring nodes affected by the fault re-route the user communications around the other side of the faulty loop to avoid the fault. In response to a fault on the communication ring, the ring nodes and service center affected by the fault re-route the user communications around the other side of the ring to avoid the fault.

EXAMPLE #2

Figure 4:
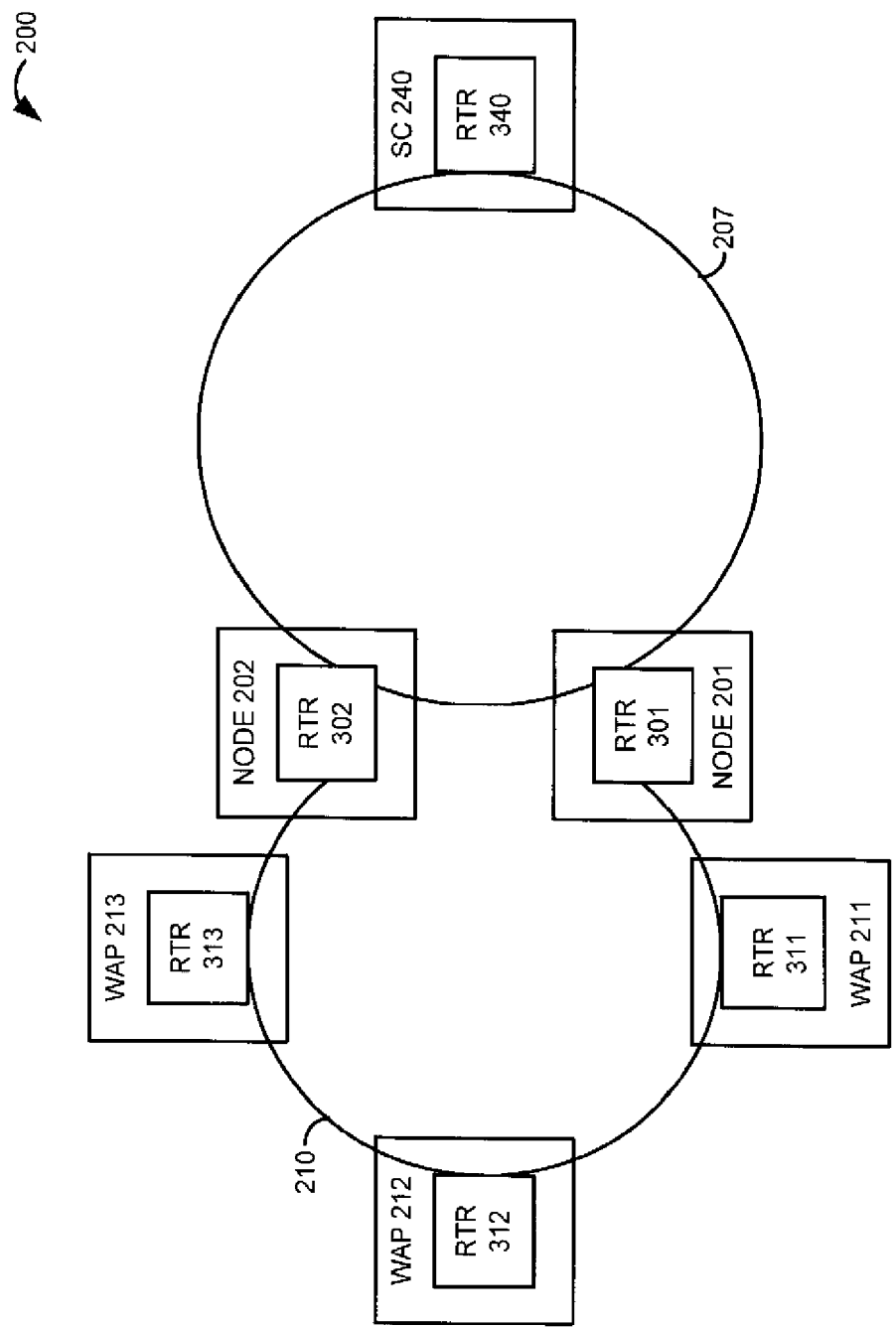
FIG. 4 illustrates a communication system including Internet protocol routers in an example of the invention.
Figure 5:
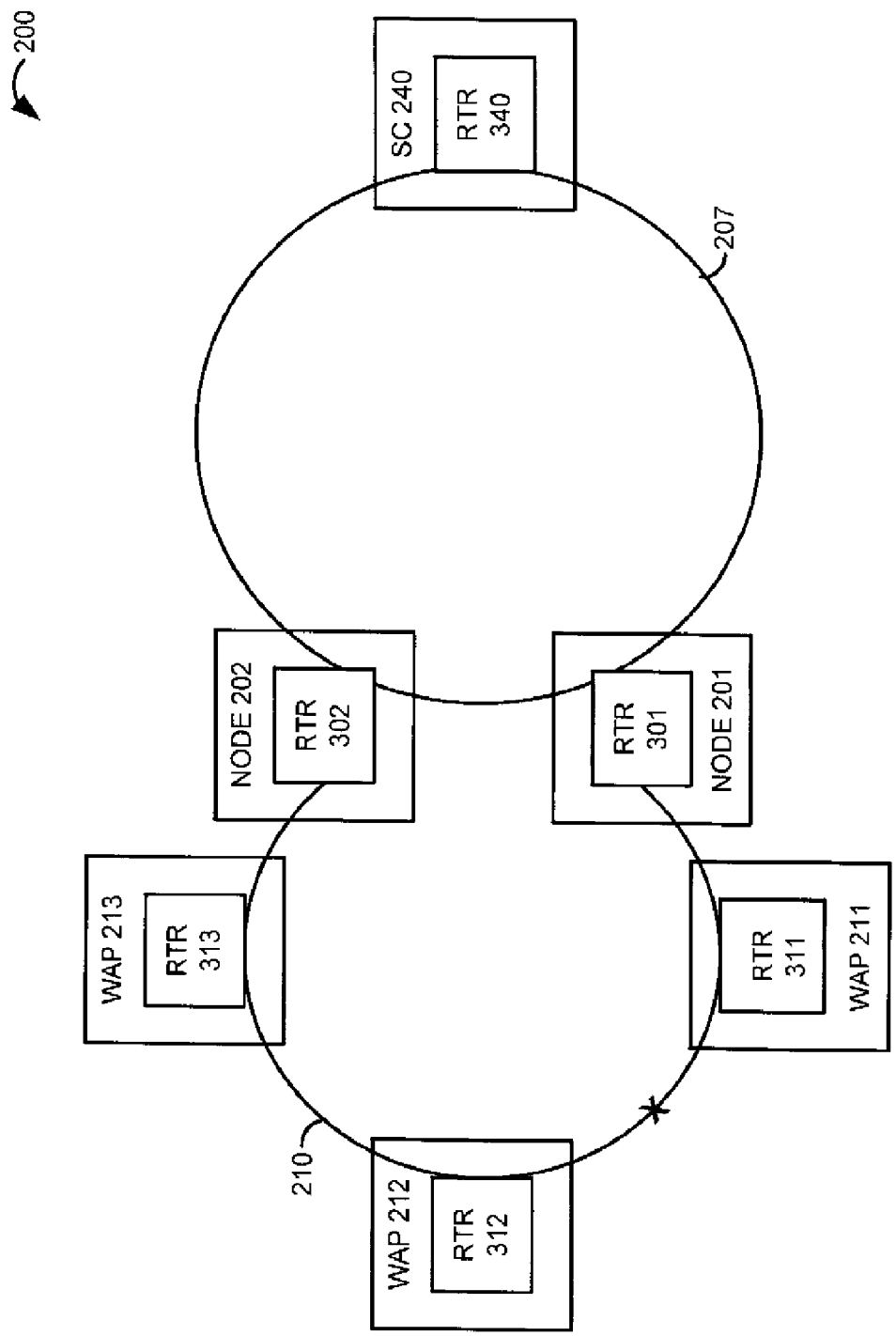
FIG. 5 illustrates a communication system experiencing a loop fault in an example of the invention.
Figure 6:
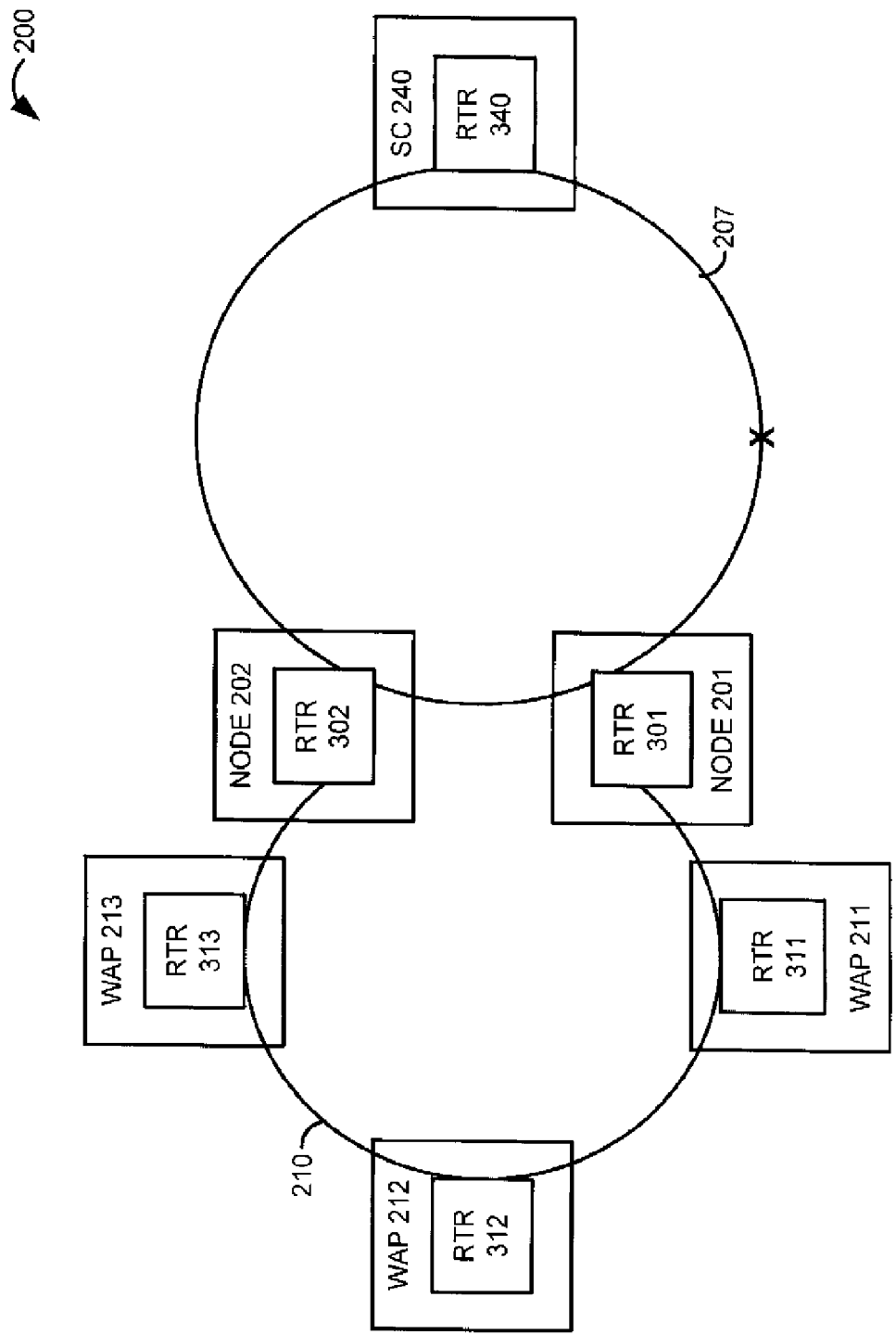
FIG. 6 illustrates a communication system experiencing a ring fault in an example of the invention.

FIGS. 4-6 illustrate communication network 200 in an example of the invention. Communication network 200 includes communication ring 207, communication loop 210, wireless access points 211-213, and service center 240. Communication ring 207 includes ring nodes 201-202. Ring nodes 201-202 include respective internet protocol routers 301-302. Wireless access points 211-213 include respective internet protocol routers 311-313. Service center 240 includes internet protocol router 340. For clarity, only one communication loop, three wireless access points, and two ring nodes are shown, but additional communication loops, ring nodes, and wireless access points that are configured and operate as described below could be added.

Service center 240 is coupled to communication ring 207. Wireless access points 211-213 are coupled to communication loop 210. The open ends of loop 210 are respectively coupled to ring nodes 201 and 202. Note that communication loop 210 is not a ring, because loop 210 has open ends that do not close. Instead, the open ends of communication loop 210 are coupled to communication ring 207 through nodes 201-202. Note that communication loop 210 is coupled to the communication ring 207 at two separate points.

Communication loop 210 is comprised of Ethernet links that transfer internet protocol packets between the internet protocol routers. Routers 301 and 311 are coupled by a first Ethernet link in loop 210. Routers 311 and 312 are coupled by a second Ethernet link in loop 210. Routers 312 and 313 are coupled by a third Ethernet link in loop 210. Routers 313 and 302 are coupled by a fourth Ethernet link in loop 210. Additional Ethernet links between the routers could be added as desired.

Communication ring 207 comprises optical links that transfer internet protocol packets between internet protocol routers. Router 301 is coupled to router 340 by first and second optical links around opposing sides of ring 207. Router 302 is coupled to router 340 by third and fourth optical links around opposing sides of ring 207. Additional optical links between the routers could be added as desired. Communication ring 207 could be a self-healing Synchronous Optical Network (SONET) ring that forms a metropolitan area network, although other types of optical networks could be used. Ring nodes 201-202 could be SONET add/drop multiplexers with Ethernet and internet protocol interfaces, although other types of optical nodes could be used.

Wireless access points 211-213 are each configured to exchange user communications in a wireless communication format with user wireless communication devices (not shown). Examples of the wireless communication devices include mobile telephones, personal digital assistants, and laptop computers although there could be other types of wireless communication devices. Examples of wireless communication formats include Code Division Multiple Access (CDMA), WIFI, and WIMAX, although there could be other types of wireless communication technology. Wireless access points 211-213 could be base stations, WIFI hotspots, antenna systems, or some other communication system that communicates with user devices using a wireless communication format.

Wireless access points 211-213 and ring nodes 201-202 exchange the user communications over loop 210. Ring nodes 201-202 and service center 240 exchange the user communications over communication ring 207. Thus, wireless access points 211-213 and service center 240 exchange the user communications over loop 210 and ring 207. Service center 207 processes the user communications to provide at least one communication service. Service center 207 could be a mobile switching center, Internet access point, media server, or some other system that provides a communication service. Examples of communication services include telephony communication, Internet access, and video streaming, although there could be other communication services.

The exchange of user communications between wireless access point 212 and service center 240 is now described in more detail. Wireless access point 212 transfers user communications that are destined for service center 240 to router 312. Wireless access point 212 may transfer internet protocol packets containing the user communication to router 312, where the packets are addressed to service center 240. Alternatively, wireless access point 212 could transfer the user communication to router 312, and router 312 could packetize the user communications with the appropriate address of service center 240.

Router 312 transfers the packets having the user communications to router 311, and in response to the packet address, router 311 transfers the packets to router 301. In response to the packet address, router 301 transfers the packets to router 340, and router 340 transfers the packets to service center 240. Alternatively, router 340 could de-packetize the user communication and transfer the de-packetized user communication to service center 240. A reciprocal operation occurs to transfer user communications from service center 240 to wireless access point 212.

Referring to FIG. 5, if there is a fault on loop 210 between wireless access points 211 and 212, router 312 senses the fault and transfers the packets to router 313 to avoid the fault. In response to the packet address, router 313 transfers the packets to router 302. In response to the packet address, router 302 transfers the packets to router 340, and router 340 transfers the packets to service center 240. Alternatively, router 340 could de-packetize the user communications in response to the packet address, and then transfer the de-packetized user communications to service center 240. A reciprocal operation would occur to transfer user communications from service center 240 to wireless access point 212 and avoid the fault.

Referring to FIG. 6, if there is a fault on ring 207 between ring node 101 and service center 240, router 301 senses the fault and transfers the packets around the other side of ring 207 to router 340. Alternatively, SONET fault detection and re-routing could be used to avoid the fault. In response to the packet address, router 340 transfers the packets to service center 240. Alternatively, router 340 could de-packetize the user communications in response to the packet address, and transfer the de-packetized user communications to service center 240. A reciprocal operation would occur to transfer user communications from service center 240 to wireless access point 212 and avoid the fault.

Although communication network 200 is described as using the internet protocol, other packet protocols and routers could be used in a similar manner if desired.

CONCLUSION

Figure 1:
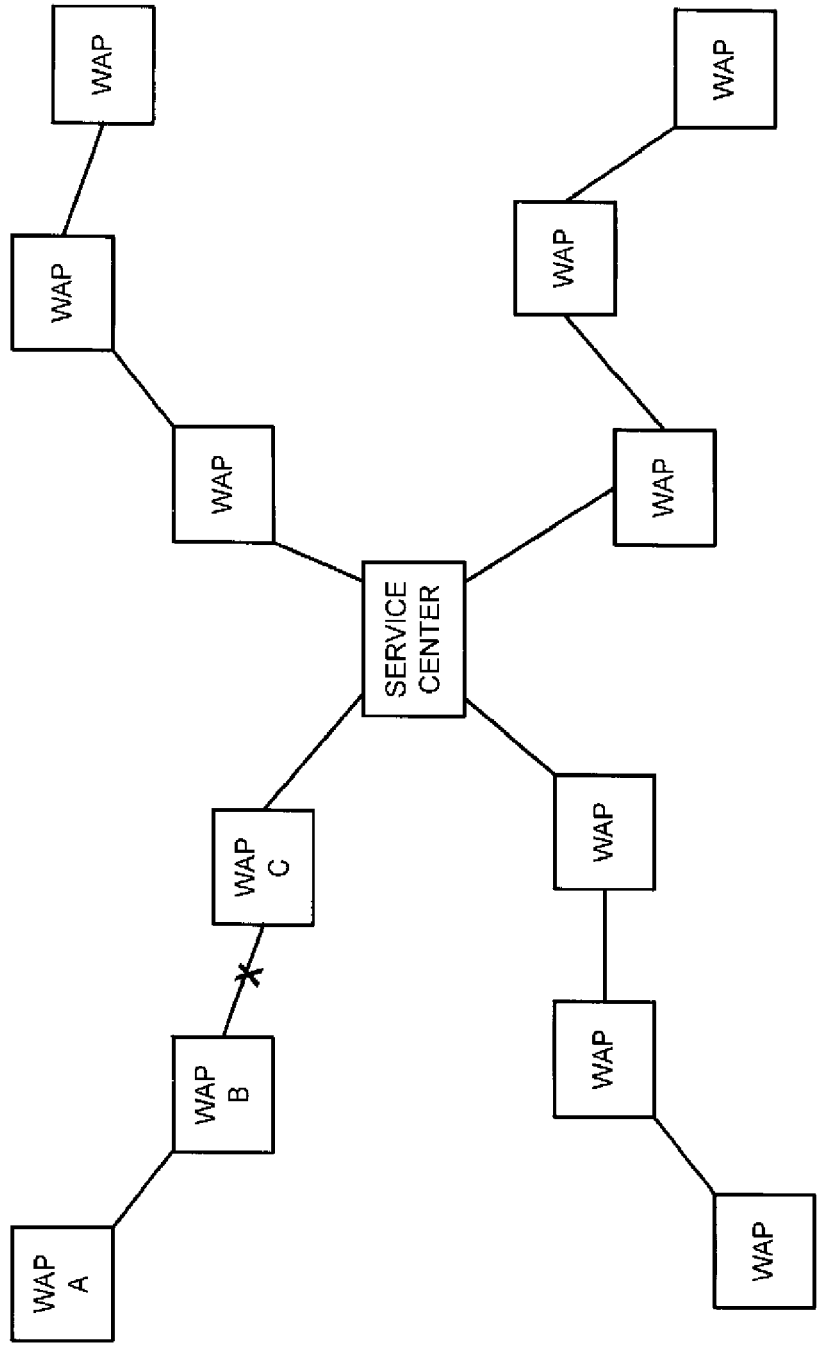
FIG. 1 illustrates a communication system with serially-connected communication nodes in an example of the prior art.
Figure 2:
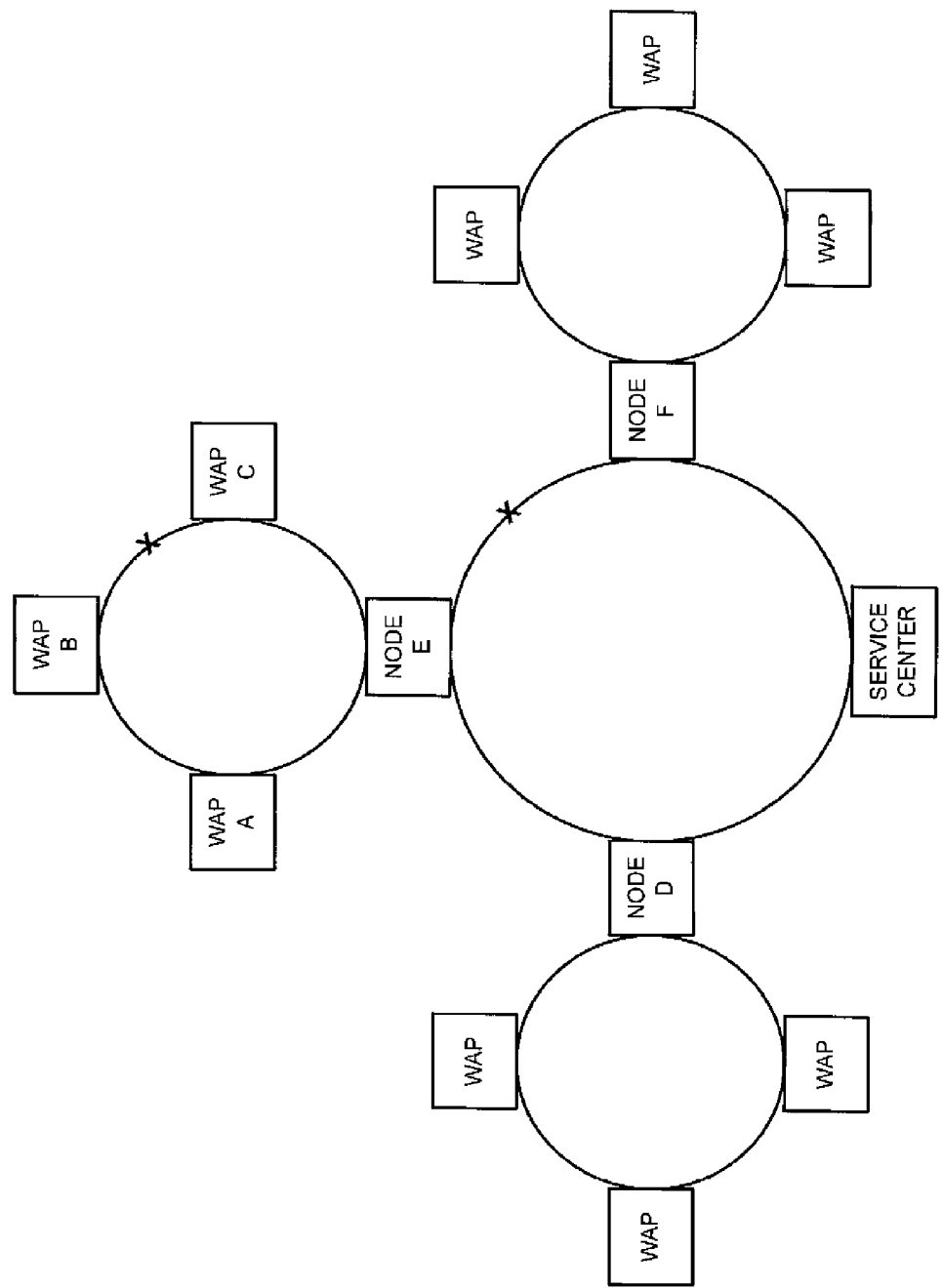
FIG. 2 illustrates a communication system experiencing a ring fault in an example of the prior art.

Advantageously, communication networks utilizing the invention avoid the lack of reliability of the prior communication network depicted in FIG. 1. Communication networks utilizing the invention also avoid the single point-of-failure in the prior communication network depicted in FIG. 2. Communication networks utilizing the invention may also employ packet routing instead of the point-to-point communication links in the prior communication networks depicted in FIGS. 1-2. Packet routing enjoys the efficiencies of statistical multiplexing the uses bandwidth more efficiently. Thus, communication networks utilizing the invention can be more reliable and more efficient than prior networks.

The invention claimed is:

1. A communication network comprising:
   a communication ring including a first communication node, a second communication node, a third communication node, and a fourth communication node;
   a first communication loop coupled to separate points on the communication ring through the first communication node and the second communication node, wherein the first communication node and the second communication node are each at an end of the first communication loop;
   a second communication loop coupled to separate points on the communication ring through the third communication node and the fourth communication node, wherein the third communication node and the fourth communication node are each at an end of the second communication loop, and wherein the first communication loop and the second communication loop are not closed to form rings;
   a service center coupled to the communication ring;
   a first set of wireless access points coupled to the first communication loop;
   a second set of wireless access points coupled to the second communication loop;
   wherein the wireless access points are configured to exchange user communications in a wireless communication format with user wireless communication devices, wherein the wireless access points and the communication nodes are configured to exchange the user communications over the communication loops, and wherein the communication nodes and the service center are configured to exchange the user communications over the communication ring.

2. The wireless communication network of claim 1 wherein the wireless access points and the communication nodes are configured, in response to a fault on one of the communication loops, to re-route the user communications to avoid the fault on the one communication loop.

3. The wireless communication network of claim 2 wherein the communication nodes and the service center are configured, in response to a fault on the communication ring, to re-route the user communications to avoid the fault on the communication ring.

4. The wireless communication network of claim 1 wherein the wireless access points and the communication nodes each include internet protocol routers that are configured to exchange the user communications over the communication loops using the internet protocol, and in response to a fault on one of the communication loops, to re-route the user communications using the internet protocol to avoid the fault on the one communication loop.

5. The wireless communication network of claim 4 wherein the service center includes an internet protocol router and wherein the internet protocol routers in the communication nodes and the service center are configured to exchange the user communications over the communication ring using the internet protocol, and in response to a fault on the communication ring, to re-route the user communications using the internet protocol to avoid the fault on the communication ring.

6. The wireless communication network of claim 4 wherein the communication loops comprise Ethernet links.

7. The wireless communication network of claim 4 wherein the communication ring comprises an optical ring.

8. The wireless communication network of claim 4 wherein the communication ring comprises a Synchronous Optical Network ring.

9. The wireless communication network of claim 4 wherein the communication ring comprises a metropolitan area network.

10. The wireless communication network of claim 4 wherein the wireless communication format comprises Code Division Multiple Access (CDMA).

11. The wireless communication network of claim 4 wherein the wireless communication format comprises WIFI.

12. The wireless communication network of claim 4 wherein the wireless communication format comprises WIMAX.

13. The wireless communication network of claim 4 wherein the service center provides telephony service.

14. The wireless communication network of claim 4 wherein the service center provides Internet access service.

15. The wireless communication network of claim 4 wherein the service center provides video streaming service.

16. The wireless communication network of claim 4 wherein the service center comprises a mobile switching center.

17. The wireless communication network of claim 4 wherein the user wireless communication devices comprise mobile telephones.

18. The wireless communication network of claim 4 wherein the user wireless communication devices comprise personal digital assistants.

19. The wireless communication network of claim 4 wherein the user wireless communication devices comprise laptop computers.

* * * * *